United States Patent [19]

Haruta

[11] Patent Number: 5,033,828
[45] Date of Patent: Jul. 23, 1991

[54] OPTICAL OUTPUT CONTROLLING METHOD AND APPARATUS

[75] Inventor: Koichi Haruta, Ichihara, Japan

[73] Assignee: Mitsui Petrochemical Industries, Ltd., Tokyo, Japan

[21] Appl. No.: 444,779

[22] Filed: Dec. 1, 1989

[30] Foreign Application Priority Data

Dec. 2, 1988 [JP] Japan .................. 63-305723

[51] Int. Cl.$^5$ .................. G02F 1/09; G02B 5/30; G02B 27/28
[52] U.S. Cl. .................. 350/378; 350/401; 350/407; 369/110
[58] Field of Search ............ 350/378, 394, 395, 401, 350/407, 402; 369/110; 365/121, 122

[56] References Cited

U.S. PATENT DOCUMENTS

| | | | |
|---|---|---|---|
| 3,704,997 | 12/1972 | Smith | 350/401 |
| 3,969,573 | 7/1976 | Bouwhuis et al. | 350/401 |
| 4,451,913 | 5/1984 | Elliott | 369/110 |
| 4,563,058 | 1/1986 | Yardy | 369/110 |
| 4,588,263 | 5/1986 | Cohen et al. | 350/401 |
| 4,672,593 | 6/1987 | Oiima et al. | 369/110 |
| 4,682,311 | 7/1987 | Matsubayashi et al. | 350/401 |
| 4,719,614 | 1/1988 | Leterme et al. | 369/110 |
| 4,766,303 | 8/1988 | Yoshizumi et al. | 350/401 |

FOREIGN PATENT DOCUMENTS 61-90347 5/1986 Japan .................. 369/110

*Primary Examiner*—Bruce Y. Arnold
*Assistant Examiner*—Martin Lerner
*Attorney, Agent, or Firm*—Sherman and Shalloway

[57] ABSTRACT

An optical output controlling method according to the present invention is employed in an optical system in which a polarized light is illuminated on a magneto-optical material, and in which the light reflected by the magneto-optical material is passed through a polarization beam splitter and then detected through an analyzer. An optical output can be adjusted by rotating the polarization beam splitter. In consequence, the Kerr rotation angle caused by the magneto-optical material can be increased, and the carrier to noise ratio can be thereby improved.

11 Claims, 5 Drawing Sheets $\varphi_0$: POLARIZER
$\varphi_1$: ANALYZER

OPTICAL OUTPUT CONTROLLING METHOD AND APPARATUS

BACKGROUND OF THE INVENTION

1. Field of the Invention

The present invention relates to an optical output controlling method and an apparatus therefor, and more particularly, to an optical modulation apparatus of the type which employs a polarization beam splitter.

2. Description of the Related Art

Optical modulation apparatuses which utilize a magneto-optical material, such as MnBi or GdTbFe, have been used to magnetooptically read out an optical disk memory.

The above-described MnBi or GdTbFe is magnetized perpendicular to the surface of its film. When part of the film is heated by means of a laser beam or the like to Curie point or above or when an external magnetic field having a magnitude higher than a fixed value is applied to part of the film, the direction of magnetization of that part of the film is reversed. Hence, when the surface of the film is radiated with the light which has been polarized by a polarizer, the rotation angle (the Kerr rotation angle) of the plane of polarization of the light reflected by the portion of the film which is magnetized in the reverse direction differs from that of the plane of polarization of the light which is reflected by the peripheral portion of that portion. More specifically, the direction of polarization of the light reflected by the upwardly magnetized portion rotates from the direction of the polarization of the polarizer by $+\theta k$, whereas the direction of polarization of the light reflected by the downwardly magnetized portion rotates by $-\theta k$, owing to the Kerr effect, as shown in FIG. 3.

Hence, by providing an analyzer at an angle at which the plane of its polarization shifts by 45 degrees relative to that of the polarizer, as indicated by $\phi$ in FIG. 4, rays of light having intensity of A or B corresponding to the upward and downward magnetizations pass through the analyzer, and a hysteresis curve shown in FIG. 5 is obtained by the presence of an external magnetic field. As a result, the change in the rotation angle can be read out as a digital signal by making $+\theta k$ and $-\theta k$ correspond to "1" and "0", respectively.

In the thus-arranged conventional optical modulation apparatus, carrier to noise ratio (C/N ratio) of the signal which is read out depends on the magnitude of the Kerr effect, which is inherent in the magneto-optical material. In consequence, the Kerr effect cannot be increased when the same material is used. In other words, C/N ratio cannot be improved unless the magneto-optical material is replaced by a new one exhibiting excellent Kerr effect.

SUMMARY OF THE INVENTION

In view of the aforementioned problem of the prior art, an object of the present invention is to provide an optical apparatus which enables the C/N ratio to be improved without the magneto-optical material being replaced with a new one.

To this end, the present invention provides an optical output controlling method which is for use in an optical system in which a polarized light irradiates a magneto-optical material, and in which the polarized light reflected by the magneto-optical material is passed through a polarization beam splitter and then detected by an analyzer. The optical output controlling method comprises a step of adjusting an optical output by rotating the polarization beam splitter.

The present invention also provides an optical output controlling apparatus of the type in which a polarized light irradiates a magneto-optical material, and in which the polarized light reflected from the magneto-optical material is reflected by a reflecting surface of a polarization beam splitter and then output through an analyzer. Assuming that the direction of polarization of the polarized light irradiating the magneto-optical material is a standard point (0 degree), the angle of the direction of polarization of the analyzer relative to the standard point is made variable or fixed at a certain value. Furthermore, the polarization beam splitter is provided in such a manner as to be rotatable or fixed at a certain angle relative to the standard point with an optical axis, i.e., the direction in which the incident polarized light is propagated, being as the center.

The polarized light irradiating the magneto-optical material may be that which is emitted from a light source and which is polarized by a polarizer. The light source may be a semiconductor laser, a He-Ne laser, an excimer laser, a dye laser, an alexandrite laser or a Ti-sapphire laser. In a case where a laser is employed as the light source, if a laser beam is a polarized light, no polarizer may be employed.

In the present invention, the Kerr rotation angle can be increased by rotating the polarization beam splitter with the direction of polarization of the polarized light being as a standard.

The polarization beam splitter is an optical element which separates an incident light into two beams of light using a double refraction crystal, i.e., which emits two beams of light which vibrate in different planes utilizing the double refraction of the crystal. Savart plate or Wollaston prism can be used as the polarization beam splitter. Practically, the polarization beam splitter is made of two rectangular prisms, the slanting surface of one of which is coated with a polarizing film (a dielectric multi-layer film) and the slanting surfaces of which are cemented together to form a cube. The polarization beam splitter transmits the beam of light (P wave) which vibrates parallel to the plane of incidence (the plane which contains an incident light and a reflected light) and reflects the beam of light (S wave) which vibrates perpendicular to the plane of incidence.

DETAILED DESCRIPTION OF THE INVENTION

Figure 1:
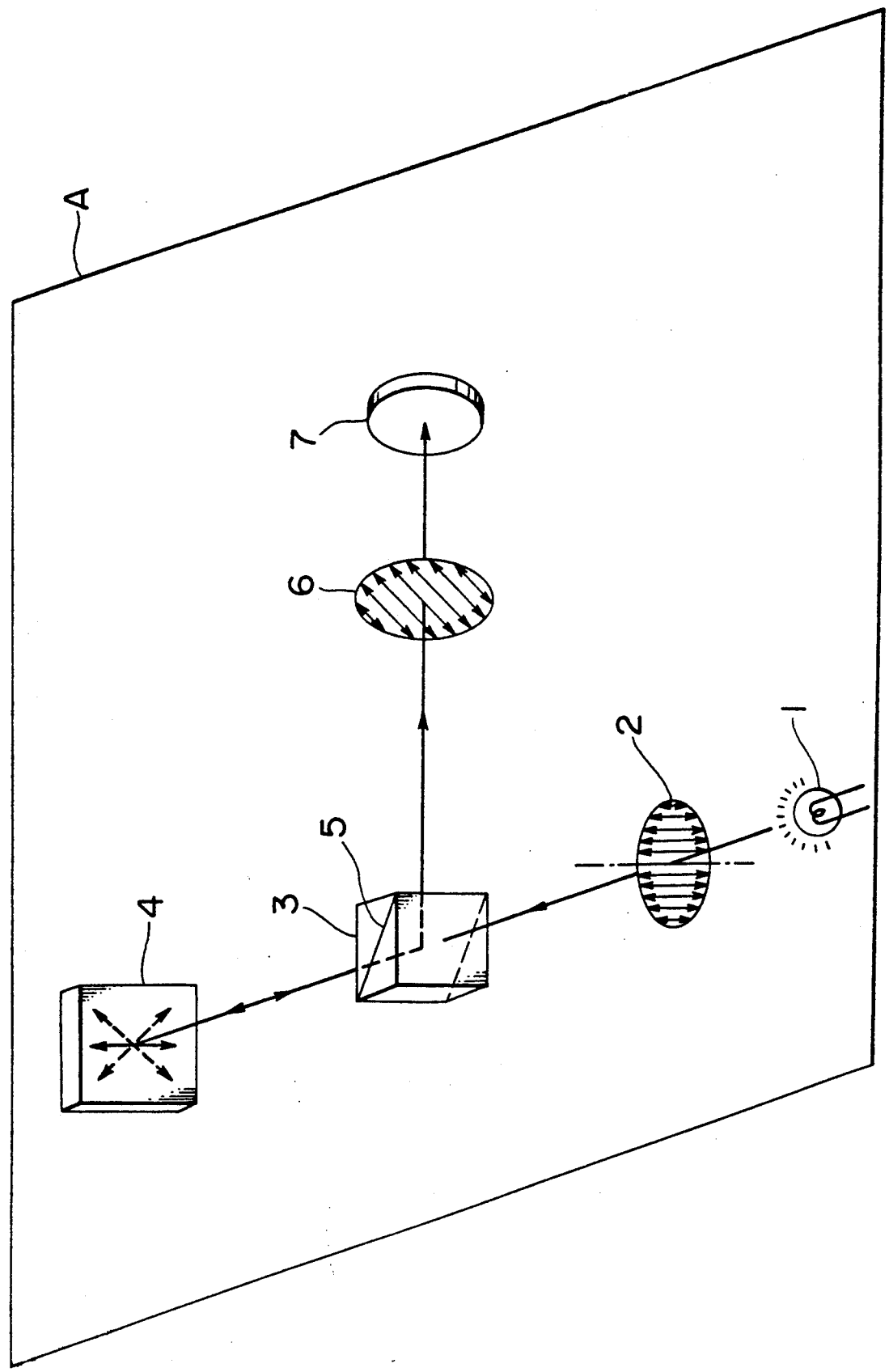
FIG. 1 is a perspective view of an optical apparatus, showing an embodiment of the present invention.

In an optical modulation apparatus according to the present invention, a light source 1, a polarizer 2, a polarization beam splitter 3 and a magneto-optical material 4 are disposed in sequence in that order. An analyzer 6 and a light-receiving element 7 are disposed on an optical path of a light reflected by a reflecting surface 5 of the polarization beam splitter 3. Assuming that the direction of polarization of the polarizer 2 is a standard (0 degree), the direction of polarization of the analyzer 6 is inclined by 45 degrees relative to the standard. Further, the azimuth angle (the angle between the direction of polarization of the polarizer 2 and the direction in which the light is reflected by the reflecting surface 5) of the polarization beam splitter 3 is set to 65±30 degrees relative to the standard.

As shown in FIG. 1, the light source 1, the polarizer 2, the polarization beam splitter 3, and the magneto-optical material 4 are disposed on an axis in that order. In consequence, the light from the light source 1 is polarized by the polarizer 2, and the polarized light irradiates the magneto-optical material 4 through the polarization beam splitter 3. Also, the analyzer 6 and the light-receiving element 7 are disposed on the optical path of a light reflected by the reflecting surface 5 of the polarization beam splitter 3. In consequence, the polarized light reflected by the magneto-optical material 4 is reflected by the reflecting surface 5 of the polarization beam splitter 3, and the resultant light is input to the light-receiving element 7 through the analyzer 6.

The light source 1 may be a He-Ne laser (Model 05-LHR-151) manufactured by MELLES GRIOT. This laser has an output of 5 mW and emits a random polarized beam (which is the same as an ordinary ray).

The polarization beam splitter 3 is a birefringent body in which the ratio of the transmittance of an incident light to the reflectivity of a returned light is 1:1, and in which the ratio of the reflectivity of P wave in the returned light to that of S wave is also 1:1.

The magneto-optical material 4 is formed by laminating on a glass substrate a film of $Si_3N_4$ in a thickness of 500 Å, a film of TbCo in a thickness of 1500 Å, a film of $Si_3N_4$ in a thickness of 100 Å and then a film of Al in a thickness of 500 Å in that order.

The above-described components are all disposed on a horizontal plane A, and all the optical paths on the axes on which the components are disposed are included in the horizontal plane A, as shown in FIG. 1. The optical axis which connects the light source 1 to the magneto-optical material 4 is perpendicular to the optical axis which connects the polarization beam splitter 3 to the light-receiving element 7. When the direction of polarization of the polarizer 2 is aligned in the vertical direction, as shown in FIG. 1, the direction of polarization of the analyzer 6 is rotated by 45 degrees clockwise relative to the vertical direction.

In that state, the polarizer 2 is rotated clockwise with the vertical direction being as the standard, i.e., 0 degree. At that time, the analyzer 6 is rotated together with the polarizer 2.

More specifically, in this embodiment, the direction of polarization of the analyzer 6 is rotated by 45 degrees with the direction of polarization of the polarizer 2 being as the standard, and the azimuth angle of the polarization beam splitter 3 is aligned with the direction of polarization of the polarizer 2, i.e., the azimuth angle is set to 0 degree. Subsequently, the polarizer 2 and the analyzer 6 are rotated together. This results in the relative rotation of the polarization beam splitter 3. By providing the polarizer 2 and the analyzer 6 in such a manner as to be rotatable and by providing the polarization beam splitter 3 as a fixed one, like the above-described example, the structure of the apparatus can be simplified.

Figure 2:
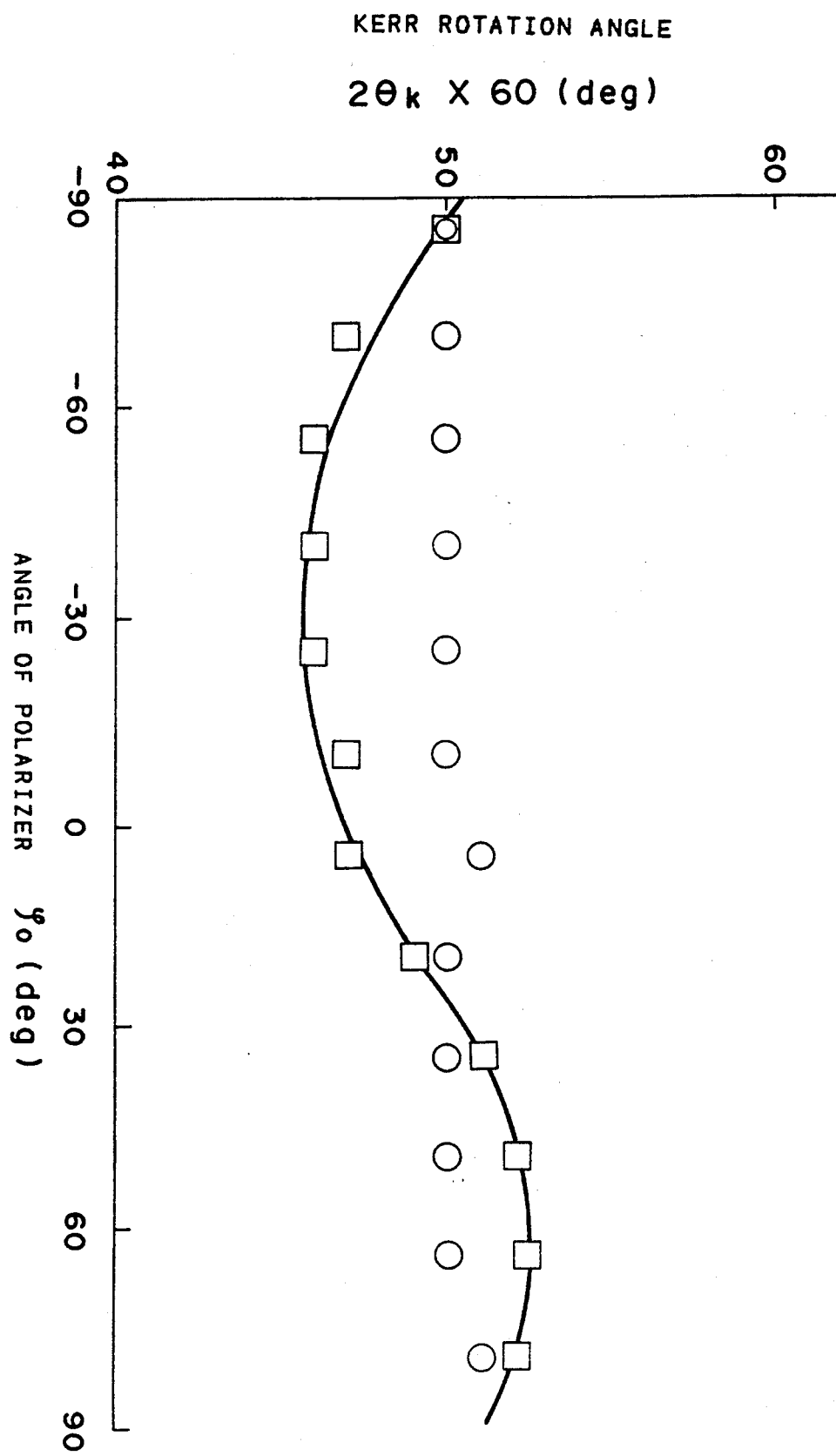
FIG. 2 is a graph, illustrating changes in the Kerr rotation angle obtained when a polarizer is rotated in a case where the direction of reflection by a polarization beam splitter is horizontally rightward, as viewed in the figure.
Figure 3:
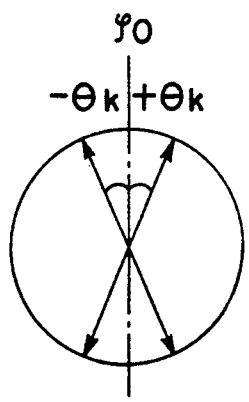
FIG. 3 illustrates the Kerr effect.
Figure 4:
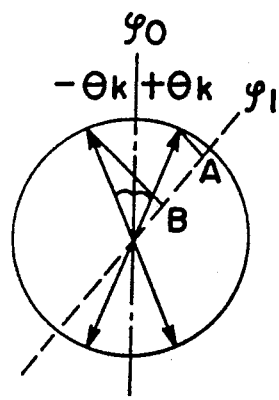
FIG. 4 illustrates an analyzing state of an analyzer.
Figure 5:
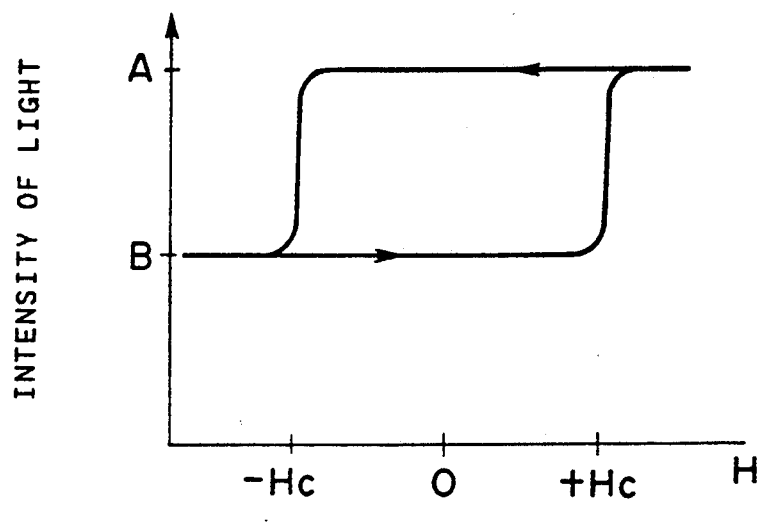
FIG. 5 is a graph, showing the relation between an intensity of light obtained by the analyzer and an external magnetic field.

How the Kerr rotation angle of the light reflected by the magneto-optical material 4 changes as the result of the rotation of the polarizer 2 and the analyzer 6 was measured using the returned light which has been reflected by the reflecting surface 5 of the polarization beam splitter 3 and which has passed through the analyzer 6, and the results of the measurements are indicated by the □—□ line in the graph in FIG. 2. It can be seen from this graph that the Kerr effect is maximized when the angle of rotation is 65 degrees relative to the standard point, and that a sufficient Kerr rotation angle can be obtained when the angle of rotation is within the range of ±30 degrees with the maximum value as the center.

Figure 6:
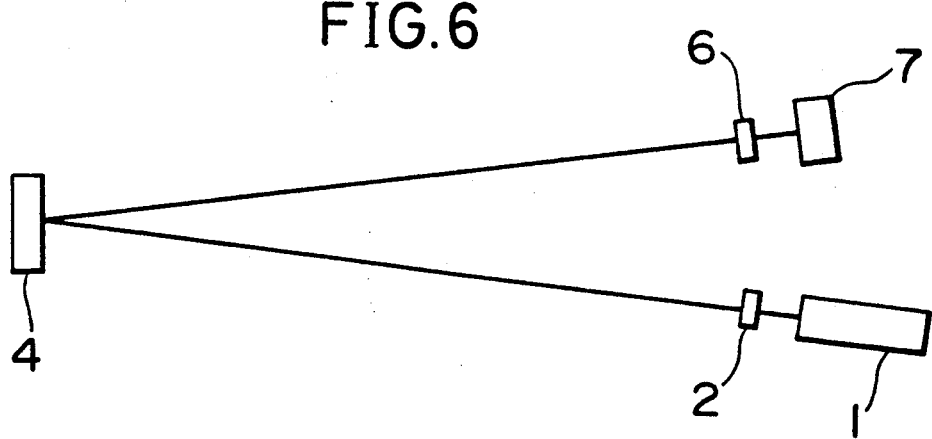
FIG. 6 shows a comparative apparatus.

An apparatus shown in FIG. 6 which employed no polarization beam splitter 3 was manufactured by way of experiment. In this apparatus, a polarized light was made incident on the magneto-optical material 4 slantingly through the laser device 1 and the polarizer 2, and the polarized light reflected slantingly was received by the light-receiving element 7 through the analyzer 6. We measured how the Kerr rotation angle changed when the analyzer 6, which was set in such a manner that the direction of polarization thereof was 45 degrees relative to the direction of polarization of the polarizer 2, was rotated together with the polarizer 2 while this angle of the analyzer was being maintained. The results of the measurement are indicated by — line in the graph of FIG. 2. It is clear from this graph that no change occurs in the Kerr rotation angle when no polarization beam splitter 3 exists. The polarized light was made incident on the magneto-optical material 4 slantingly because it was impossible to take out a reflected light when the light was incident perpendicular to the magneto-optical material without being passe through the polarization beam splitter 3.

Thus, according to the present invention, it is possible to increase the Kerr rotation angle with the same magneto-optical material, thereby improving the carrier to noise ratio. Furthermore, since the Kerr rotation angle can be varied, the output of the laser beam can be adjusted, making it possible for the apparatus to be also utilized as an optical amplification apparatus.

The polarization beam splitter 3 may be fixed at a position which is 65 degrees from the standard point. Alternatively, the Kerr rotation angle may be varied so that the output can be adjusted by rotatably providing the polarization beam splitter 3.

Figure 7:
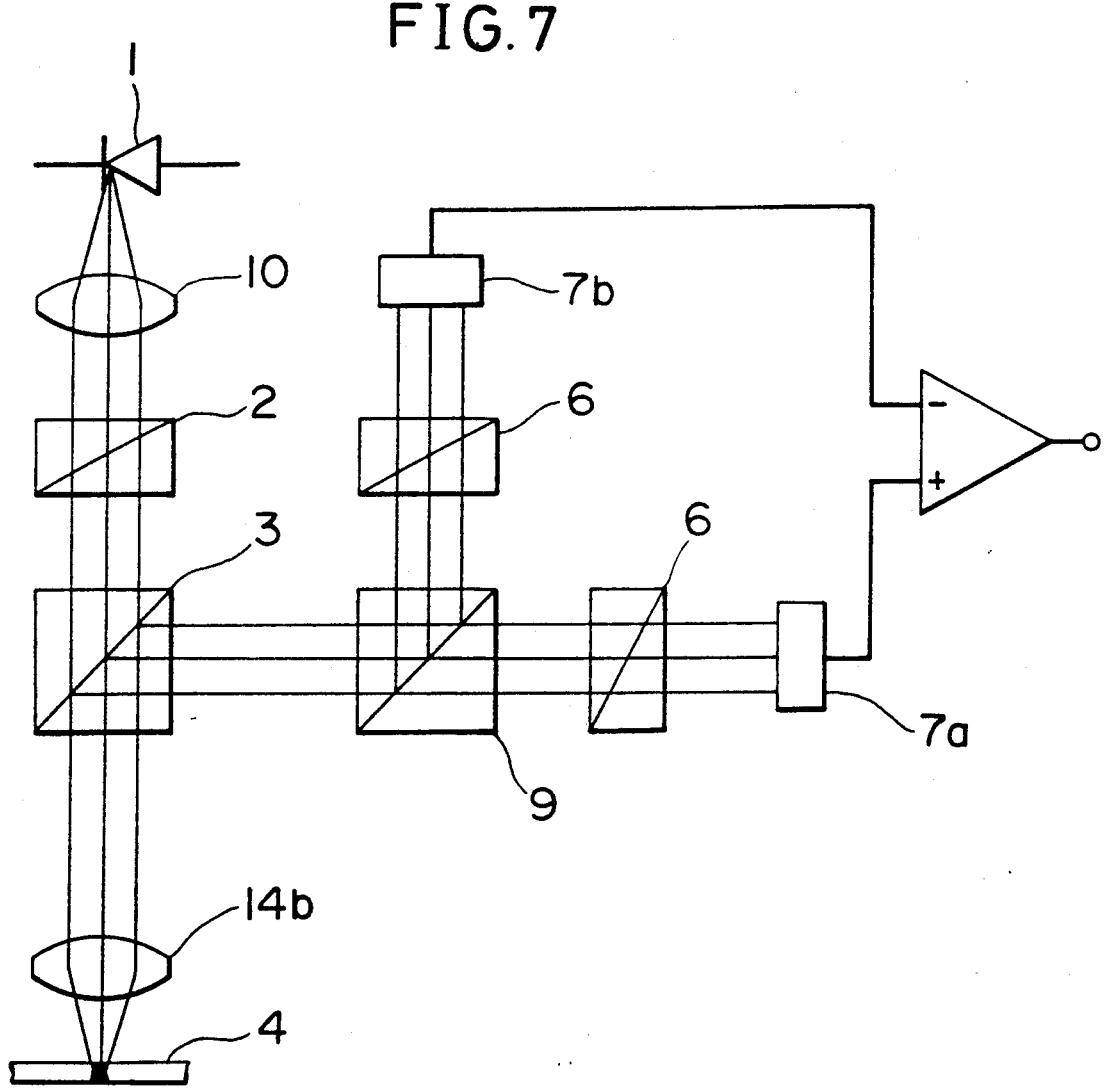
FIGS. 7 and 8 show other embodiments of the present invention.

The optical modulation apparatus according to the embodiment of present invention illustrated in FIG. 7 may also be of a differential type in which a half mirror 9 is provided between the analyzer 6 and the polarization beam splitter 3 to split the light reflected by the reflecting surface 5 of the polarization beam splitter 3 into two fractions. One of the two fractions of the reflected light is received by a light-receiving element 7a where it is converted into an electrical signal, and the other fraction is received by another light-receiving element 7b where it is converted into an electrical signal, the two outputs being supplied to a differential amplifier. In FIG. 7, a reference numeral 10 denotes a lens, and 14b denotes an objective lens.

Figure 8:
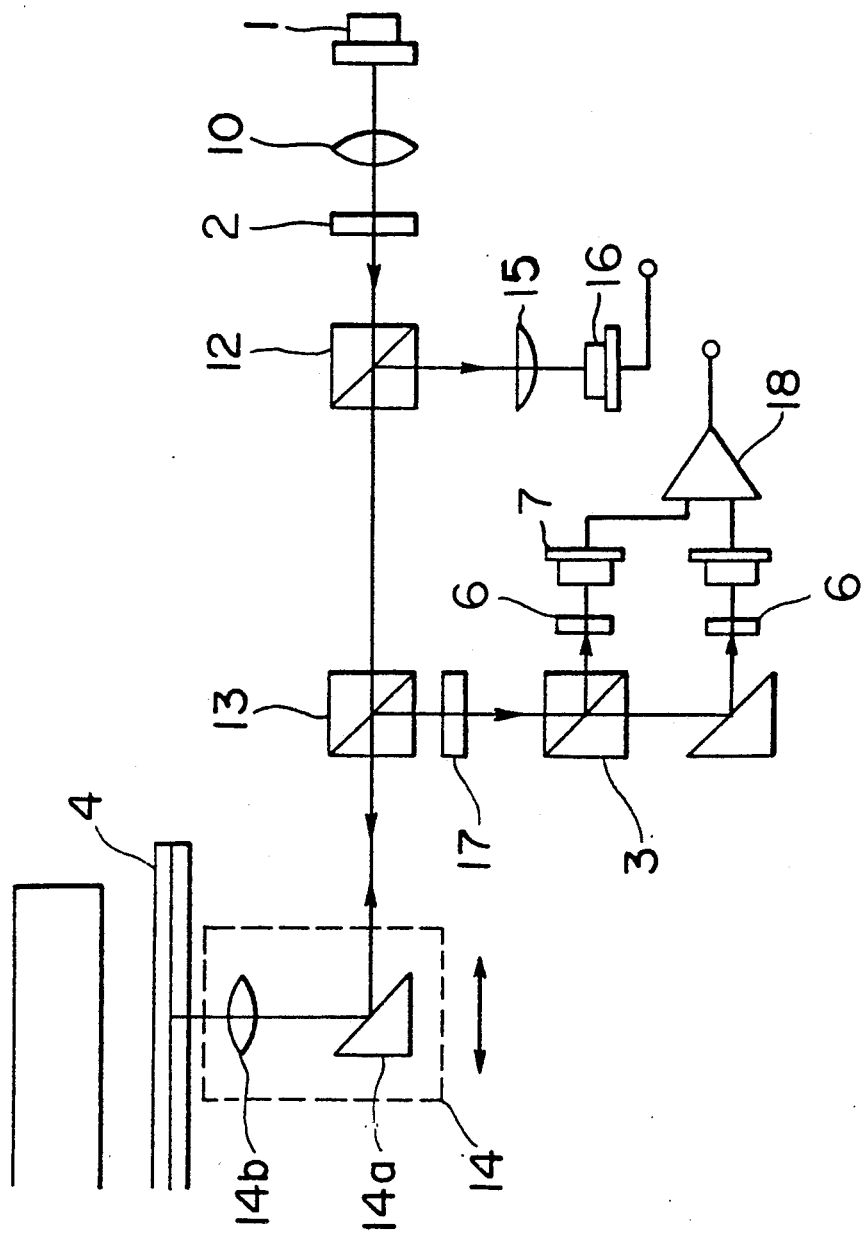

An example of an optical head to which the present invention is applied will be described below with reference to FIG. 8.

In this optical head, a semiconductor laser 1 which serves as a light source, a lens 10, a polarizer 2, a first beam splitter 12, a second beam splitter 13, a mirror 14a and an objective lens 14b which form a pick-up portion 14 are disposed in that order, so that the laser beam from the light source can irradiate an optical magnetic disk 4, which is the magneto-optical material. The laser beam reflected by the reflecting surface of the first beam splitter 12 is received by a first light-receiving element 16 through a cylindrical lens 15 to allow it to be output as a servo signal.

The laser beam reflected by the reflecting surface of the second beam splitter 13 passes through a halfwave plate 17, and is separated into two fractions by the polarization beam splitter 3. The separated two rays of light are respectively received by the light-receiving elements 7 through the analyzers 6, and the outputs of the light-receiving elements 7 are compared by a differential amplifier 18, the resulting signal being output as a magneto-optical detection signal.

In the present invention, the Kerr rotation angle can be increased to improve the carrier to noise ratio by rotating the polarization beam splitter 3. In the example shown in FIG. 8, the polarized light directly irradiates the magneto-optical material (optical magnetic disk) without passing through the polarization beam splitter 3, whereas the polarized light passes through the polarization beam splitter 3 and irradiates the magneto-optical material, in the example shown in FIG. 1. In an optical system in which a polarized light irradiates the magneto-optical material, and in which the polarized light reflected by the magneto-optical material is passed through a polarization beam splitter and then detected through an analyzer, optical elements can be arranged in any positional relationship so long as the output can be adjusted by rotating the polarization beam splitter.

The analyzer may be provided in such a manner as to be rotatable so that the relation between the polarized light or the direction of polarization of the polarizer and the direction of polarization of the analyzer can be set in an arbitrary fashion.

In the present invention, the Kerr rotation angle can be thus increased, and the C/N ratio can be thereby improved.

What is claimed is:

1. In a method of controlling an optical output for use in an optical system in which a polarized light passed through a polarizer is illuminated on a magneto-optical material, and in which the polarized light reflected by the magneto-optical material is passed through a polarization beam splitter and then detected through an analyzer, the improvement comprising:

adjusting an optical output by assuming that the direction of polarization of said polarized light which irradiates the magneto-optical material is a standard point (0 degree), and inclining the direction of polarization of said analyzer by 45 degrees from said standard point, and rotating said polarizer and said analyzer together or the polarization beam splitter by 65±30 degrees relative to said standard point.

2. A method of controlling an optical output according to claim 1 wherein said polarization beam splitter is a birefringent body in which the ratio of the transmittance of an incident light to the reflectivity of a returned light is 1:1, and in which the ratio of the reflectivity of P wave in the returned light to that of S wave is also 1:1.

3. An optical output control apparatus comprising:

a polarization beam splitter on said optical axis for receiving said polarized light and including a reflecting surface for transmitting said light along said optical axis and at right angles to said optical axis, a magneto-optical material for receiving light transmitted from said polarization beam splitter along said optical axis and for transmitting light back to said polarization beam splitter along said optical axis, an analyzer for receiving the light transmitted by said polarization beam splitter at right angles to said optical axis, said analyzer having a direction of polarization which is inclined at an angle of 45 degrees relative to the below defined standard point, a light-receiving element for receiving light transmitted by said analyzer, said standard point being defined as the direction of polarization of said polarized light which irradiates said magneto-optical material and which is assigned a value of 0 degrees, and means for adjusting the azimuth angle between the direction of polarization of said means for generating polarized light and the direction of reflection of the reflecting surface of said polarization beam splitter to 65±30 degrees relative to said standard point.

4. The apparatus of claim 3 wherein said means for adjusting comprises means for rotating said polarization beam splitter.

5. The apparatus of claim 3 wherein said means for adjusting comprises means for rotating both said means for generating polarized light and the analyzer.

6. The apparatus of claim 3 wherein said means for generating polarized light comprises a light source and a polarizer.

7. The apparatus of claim 6 wherein said light source comprises a laser.

8. The apparatus of claim 3 wherein said means for generating polarized light comprises means for generating a polarized laser beam.

9. The apparatus of any one of claims 3, 4, 5, 6 or 8 wherein said polarization beam splitter is a birefringent body in which the ratio of the transmittance of an incident light to the reflectivity of a returned light is 1:1, and in which the ratio of the reflectivity of P wave in the returned light to that of S wave is also 1:1.

10. The apparatus of claim 3 which further comprises a half-mirror interposed between the polarization beam splitter and the analyzer, a second analyzer and a second light receiving element arranged to receive a portion of light transmitted by said half-mirror, said light receiving elements converting incident light into electrical signals, and a differential amplifier for receiving said electrical signals.

11. An optical output control apparatus for use in an optical head comprising a light source, a polarizer optically aligned with said light source, a magneto-optical disk for receiving polarized light from said light source, means for receiving light reflected from said magneto-optical disk and for transmitting said light at right angles to the optical axis of said light source and said polarizer, a polarization beam splitter for receiving light transmitted by said receiving means and including a reflecting surface for transmitting light parallel to said optical axis, an analyzer for receiving light transmitted by said polarization beam splitter, said analyzer having a direction of polarization which is inclined at an angle of 45 degrees relative to the below defined standard point, a light-receiving element for receiving light transmitted by said analyzer, said standard point being defined as the direction of polarization of said polarization light which irradiates said magneto-optical material and which is assigned a value of 0 degrees, and means for adjusting the azimuth angle between the direction of polarization of the polarizer and the direction of reflection of the reflecting surface of said polarization beam splitter to 65±30 degrees relative to said standard point.

* * * * *